(12) United States Patent
Yamamoto et al.

(10) Patent No.: US 12,485,414 B2
(45) Date of Patent: Dec. 2, 2025

(54) MICROCHANNEL DEVICE

(71) Applicant: CANON KABUSHIKI KAISHA, Tokyo (JP)

(72) Inventors: Takeshi Yamamoto, Kanagawa (JP); Hiroki Tanaka, Kanagawa (JP); Jun Miura, Kanagawa (JP); Keiji Miyazaki, Tokyo (JP); Makoto Fukatsu, Shizuoka (JP); Akihisa Matsukawa, Tokyo (JP); Takayuki Kanazawa, Kanagawa (JP); Keigo Mizusawa, Kanagawa (JP); Masanori Seki, Kanagawa (JP); Masanori Tanaka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 872 days.

(21) Appl. No.: 17/674,060

(22) Filed: Feb. 17, 2022

(65) Prior Publication Data

US 2022/0168731 A1   Jun. 2, 2022

Related U.S. Application Data

(63) Continuation of application No. PCT/JP2020/031861, filed on Aug. 24, 2020.

(30) Foreign Application Priority Data

Aug. 29, 2019  (JP) .................................. 2019-156719
Jul. 31, 2020  (JP) .................................. 2020-130485

(51) Int. Cl.
*B01L 3/00* (2006.01)
*C08G 61/08* (2006.01)

(52) U.S. Cl.
CPC ........ *B01L 3/502707* (2013.01); *C08G 61/08* (2013.01); *B01L 2200/12* (2013.01); *B01L 2300/0887* (2013.01); *B01L 2300/12* (2013.01)

(58) Field of Classification Search
CPC ........ G01N 35/08; G01N 37/00; C08G 61/08; B81B 1/00; B01L 2200/12;
(Continued)

(56) References Cited

U.S. PATENT DOCUMENTS 10,494,492 B2   12/2019   Ata et al.
2007/0102362 A1*   5/2007   Iida ................... B01L 3/502753
                                                    210/656

(Continued)

FOREIGN PATENT DOCUMENTS

JP       2006-326704 A    12/2006
JP       2012-66518 A      4/2012
(Continued)

OTHER PUBLICATIONS

International Preliminary Report on Patentability in International Application No. PCT/JP2020/031861 (Mar. 2022).
(Continued)

*Primary Examiner* — Jennifer Wecker
(74) *Attorney, Agent, or Firm* — Venable LLP

(57) ABSTRACT

Provided is a microchannel device, which has high hydrophobicity, high mechanical strength, and safety and also has high solvent resistance, and thus has wider applicability. The microchannel device includes a porous substrate having formed therein channel walls each containing a cyclic olefin copolymer that is a copolymer of an alkene and a cyclic olefin.

13 Claims, 10 Drawing Sheets

(58) Field of Classification Search
CPC ......... B01L 2300/0887; B01L 2300/12; B01L 2300/126; B01L 2300/165; B01L 2400/0406; B01L 3/5023; B01L 3/502707; B01J 19/00
See application file for complete search history.

(56) References Cited

U.S. PATENT DOCUMENTS

| | | |
|---|---|---|
| 2011/0182775 A1 | 7/2011 | Kitamura |
| 2012/0070878 A1 | 3/2012 | Fink et al. |
| 2012/0198684 A1 | 8/2012 | Carrilho et al. |
| 2013/0174973 A1* | 7/2013 | Ivory ............... G01N 27/44756 156/219 |
| 2016/0008812 A1 | 1/2016 | Kobayashi |
| 2017/0246631 A1* | 8/2017 | Varenne ............ B01L 3/502707 |
| 2018/0036727 A1* | 2/2018 | Li ................... G01N 33/54373 |
| 2021/0057700 A1* | 2/2021 | Huang ................ H01M 50/423 |
| 2022/0275135 A1* | 9/2022 | Murase ................ C09D 165/00 |

FOREIGN PATENT DOCUMENTS

| | | | |
|---|---|---|---|
| JP | 2015-52584 A | 3/2015 | |
| JP | 2015-131257 A | 7/2015 | |
| JP | 5935153 B2 | 6/2016 | |
| JP | 2019-70079 A | 5/2019 | |
| WO | 2010/038897 A1 | 4/2010 | |
| WO | 2016/133207 A1 | 8/2016 | |
| WO | WO-2020110958 A1 * | 6/2020 | ............ C08F 287/00 |
| WO | WO-2020128060 A1 * | 6/2020 | ........ B01L 3/502715 |
| WO | 2021/039728 A1 | 3/2021 | |
| WO | 2021/039740 A1 | 3/2021 | |

OTHER PUBLICATIONS

International Search Report in International Application No. PCT/JP2020/031861 (Nov. 2020).
Notice of Reasons for Refusal in Japanese Application No. 2020-130485 (Nov. 2023).
U.S. Appl. No. 17/677,181 filed Feb. 22, 2022, Yamamoto et al.

* cited by examiner

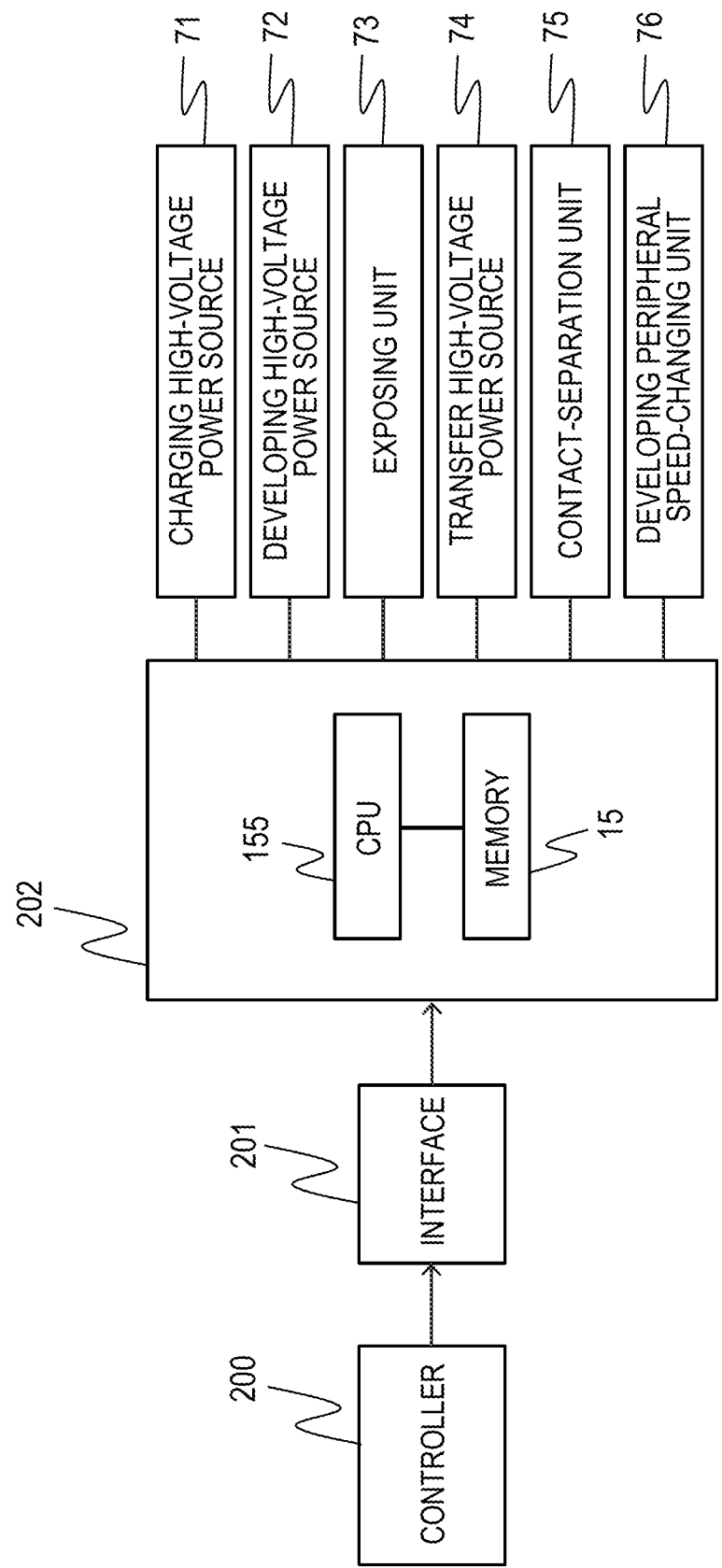

MICROCHANNEL DEVICE

CROSS-REFERENCE TO RELATED APPLICATIONS

This application is a Continuation of International Patent Application No. PCT/JP2020/031861, filed Aug. 24, 2020, which claims the benefit of Japanese Patent Application No. 2019-156719, filed Aug. 29, 2019, and Japanese Patent Application No. 2020-130485, filed Jul. 31, 2020, all of which are hereby incorporated by reference herein in their entirety.

BACKGROUND OF THE INVENTION

Field of the Invention

The present invention relates to a microchannel device having a microchannel formed in a porous substrate.

Description of the Related Art

In recent years, the development of a microchannel device that can perform analysis in biochemistry in one chip efficiently (with a trace amount of a sample, and rapidly and simply) through utilization of a microsize fine channel has been attracting attention in a wide variety of fields. Specifically, the development has been attracting attention in the respective fields of, for example, medicine, drug discovery, healthcare, environment, and food as well as biochemical research. Of such devices, a paper microanalysis chip based on paper has an advantage in that the chip is lightweight and available at low cost as compared to related-art devices, eliminates the need for the use of a power source, and has high disposability. Accordingly, the chip has been expected as a test device to be used in, for example, medical activities in developing countries and remote places where medical equipment is not prepared, and disaster sites, and an airport where the spread of an infectious disease needs to be prevented at the border. In addition, the chip is inexpensive and easy to handle, and hence has also been attracting attention as a healthcare device that can manage and monitor the health state of oneself.

In the former half of 1990s, a microanalysis chip for performing the pretreatment, stirring, mixing, reaction, and detection of a sample on one chip was developed by forming a fine channel of a micron size on glass or silicon through use of, for example, a photolithography method or a die. As a result, the downsizing of a test system and an increase in analysis speed thereof, and a reduction in amount of a specimen, a reagent, or a waste liquid were achieved. The microchannel produced by using the photolithography technology has extremely high accuracy. Meanwhile, however, a production cost for the microchannel is extremely expensive. In addition, the microchannel is difficult to incinerate, and hence has low disposability. In addition, an incidental device, such as a syringe pump, is required at the time of the delivery of a test liquid into the channel, and hence the chip is limited to use in an environment where equipment is prepared. Accordingly, the chip has been mainly used in biochemical research institutes.

To solve those problems, in the paper microanalysis chip, an inexpensive material, such as paper or cloth, is used as its substrate, and the capillary action of the material itself is utilized to enable the driving of a specimen or a test liquid. Accordingly, the chip can be used at low cost and in an environment without electricity. In addition, the chip is easy to carry (distribute) and has high disposability (its disposal is completed merely by its combustion). Further, the maintenance of the device is not required, and hence anyone (even an old person or child with no knowledge) can easily perform point of care (POC) diagnosis with the device anywhere (no matter where the diagnosis is performed, specifically even in a place with no power source) at low cost. Accordingly, the research and development of a paper microchannel device intended for various infectious diseases and specific diseases, and healthcare (chronic disease management and health management) have been currently advanced in research institutes in the world.

The microchannel device uses a liquid as a specimen or a test liquid, and hence a material for forming a channel thereof is required to have high hydrophobicity for preventing the exudation of the liquid into a channel wall and preventing the swelling of the channel wall due to water absorption at the time of the use of the device under a high-humidity environment. The term "channel wall" means a wall that defines the channel through which the liquid flows.

The channel material preferably has, as a characteristic except the foregoing, high solvent resistance so as not to inhibit the analysis of the specimen or the test liquid. In addition, the material is simultaneously required to have, for example, high mechanical strength and human body safety.

In Japanese Patent Application Laid-Open No. 2015-52584, there is a proposal of a microchannel device utilizing polystyrene as a channel material. In addition, in Japanese Patent No. 5935153, there is a proposal of an example in which a UV-curable ink is utilized as a channel material, and in each of U.S. Patent Application Publication No. 2012/0198684 and Japanese Patent Application Laid-Open No. 2015-131257, there is a proposal of an example in which a wax ink is utilized as a channel material. Each of the materials, such as the polystyrene, the UV-curable ink, and the wax ink, shows high hydrophobicity, and has sufficient mechanical strength and human body safety. However, each of the materials has low solvent resistance against an organic solvent, and is hence easily compatible with solvents, such as alcohols, ketones, and esters. As a result, each of the materials has involved a problem in that when a specimen or test liquid containing an organic solvent is used, the clogging or burst of a channel occurs owing to the swelling or dissolution of a channel wall.

In view of the foregoing, the present invention proposes a microchannel device, which has high hydrophobicity, high mechanical strength, and human body safety and also has high solvent resistance to enable the use of a wider variety of specimens and test liquids, and thus has wide applicability.

An object of the present invention is to provide a microchannel device, which has high hydrophobicity, high mechanical strength, and human body safety and also has high solvent resistance, and thus has wider applicability.

SUMMARY OF THE INVENTION

According to one aspect of the present invention, there is provided a microchannel device including a porous substrate having formed therein channel walls each containing a cyclic olefin copolymer that is a copolymer of an alkene and a cyclic olefin.

Further features of the present invention will become apparent from the following description of exemplary embodiments with reference to the attached drawings.

BRIEF DESCRIPTION OF THE DRAWINGS

FIG. 4 is a block diagram for illustrating the schematic control mode of the channel pattern-forming unit.

DESCRIPTION OF THE EMBODIMENTS

An exemplary embodiment of the present invention is described below with reference to the drawings. The following embodiment is illustrative, and the present invention is not limited to the contents of the embodiment. In addition, in the following respective drawings, constituents that are not required for the description of the embodiment are omitted from the drawings.

In the present invention, a material containing a cyclic olefin copolymer obtained by copolymerizing a cyclic olefin is caused to permeate into a porous substrate to form a channel wall.

The porous substrate is described later.

<Cyclic Olefin Copolymer>

The cyclic olefin copolymer (COC) according to the present invention is a copolymer of an alkene (non-cyclic olefin) and a cyclic compound (cyclic olefin).

The alkene is preferably an alkene having 2 to 12 carbon atoms, more preferably a lower alkene having 2 to 6 carbon atoms (α-olefin, non-cyclic olefin in a broad sense).

Examples of the alkene include ethylene, propylene, and butylene. Of those, ethylene is preferred.

The alkenes may be used alone or in combination thereof.

The cyclic olefin is preferably a cyclic olefin having 3 to 17 carbon atoms, more preferably a cyclic olefin having 5 to 12 carbon atoms, and may be a monocyclic compound or a polycyclic compound.

The cyclic olefin preferably has a crosslinked structure. Examples of such cyclic olefin include norbornene, norbornadiene, tetracyclododecene, dicyclopentadiene, and cyclohexene. Of those, norbornene is preferred.

The cyclic olefin may have one or two or more substituents. Examples of the substituent include alkyl groups, such as a methyl group and an ethyl group.

The cyclic olefins may be used alone or in combination thereof.

The structures of the alkene and the cyclic olefin in the cyclic olefin copolymer may be identified by NMR.

The content ratio "alkene/cyclic olefin" of the alkene to the cyclic olefin is preferably from 20/1 to 1/20.

The content ratio of the alkene to the cyclic olefin may be identified by NMR.

<Channel Pattern-Forming Unit>

Figure 2:
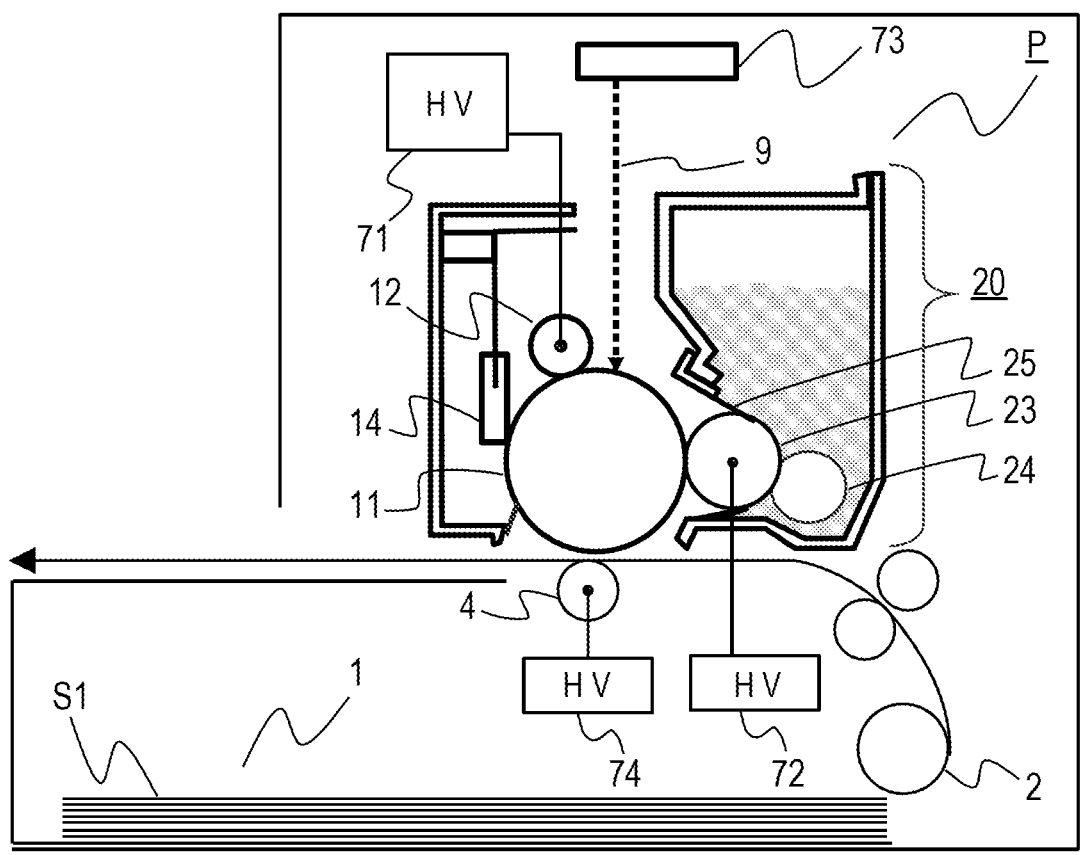
FIG. 2 is a configuration view of a channel pattern-forming unit.
Figure 3:
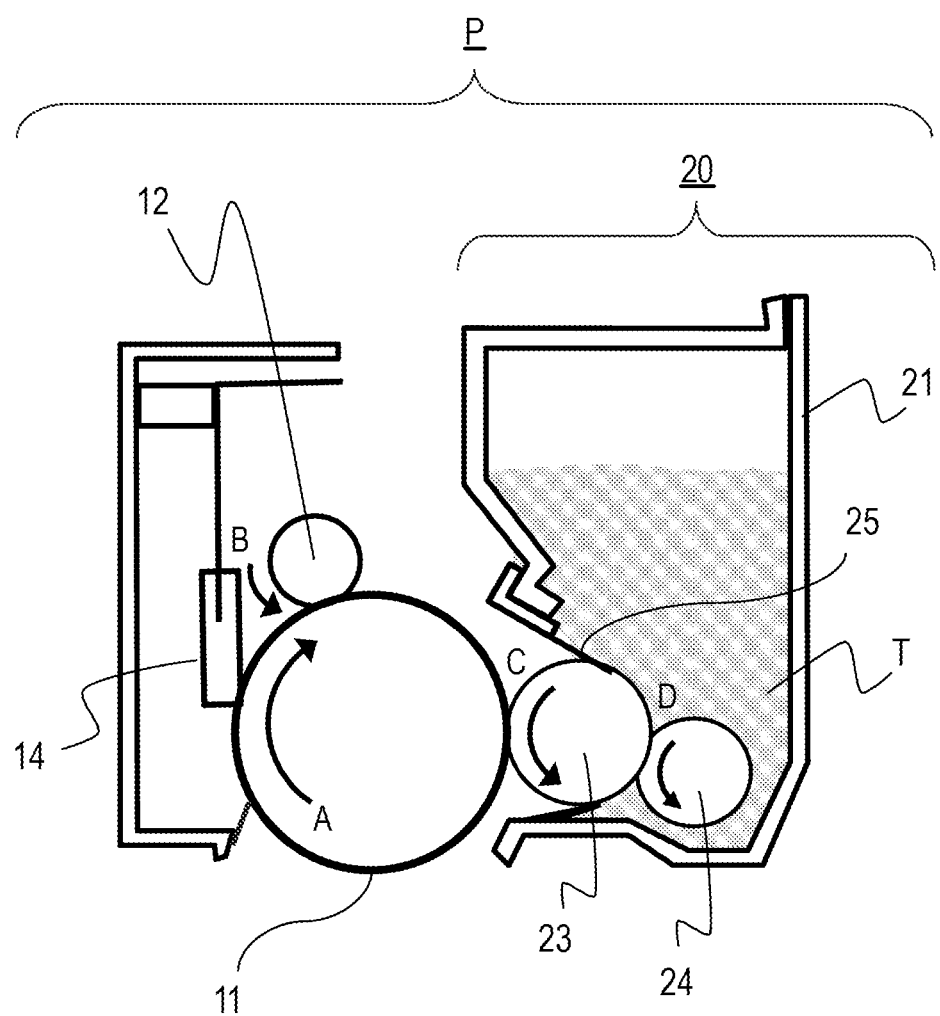
FIG. 3 is a configuration view of a process cartridge P.

The entire configuration of a channel pattern-forming unit is described with reference to FIG. 2, FIG. 3, and FIG. 4. FIG. 2 is a sectional view for illustrating the schematic configuration of the channel pattern-forming unit, and each configuration is simply illustrated in the figure. FIG. 3 is a schematic sectional view of a process cartridge P. FIG. 4 is a block diagram for illustrating the schematic control mode of the main portion of the channel pattern-forming unit in this embodiment.

First, the configuration of the channel pattern-forming unit, a channel pattern-forming process, and each member are described. The respective members involved in the channel pattern-forming process are described with reference to FIG. 2 and FIG. 3 along the order of the channel pattern-forming process.

The channel pattern-forming unit can accommodate the process cartridge P. The process cartridge P includes a photosensitive drum 11 as an image-bearing member. A charging roller 12, a developing device 20, and a cleaning member 14 are arranged around the photosensitive drum 11. The charging roller 12 is a roller-shaped charging member for charging the surface of the photosensitive drum 11. The developing device 20 develops an electrostatic latent image formed on the surface of the photosensitive drum 11 with resin particles serving as a developer. The cleaning member 14 cleans the surface of the photosensitive drum 11. A voltage required at the time of channel pattern formation can be applied by a charging high-voltage power source 71, a developing high-voltage power source 72, and a transfer high-voltage power source 74, and is controlled by a controlling portion 202 (FIG. 4). In addition, the channel pattern-forming unit can drive the photosensitive drum 11 of the process cartridge P with a motor M1 (not shown), and can drive the developing device 20 of the process cartridge P with a motor M2 (not shown).

When the channel pattern formation starts, the photosensitive drum 11 is driven by the motor M1 to rotate in a direction indicated by an arrow A in FIG. 3, and the charging roller 12 rotates in a direction indicated by an arrow B in FIG. 3 following the rotation of the photosensitive drum 11. In Examples to be described later, the process speed of the photosensitive drum 11 was set to 150 mm/sec.

The photosensitive drum 11 is formed by arranging a photosensitive material, such as an OPC, amorphous selenium, or amorphous silicon, on a drum base on a cylinder formed of, for example, aluminum or nickel. In Examples to be described later, the outer diameter of the cylinder was set to 20 mm, and the thickness of the photosensitive material was set to 13 µm.

A single-layer roller formed of a conductive mandrel (conductive cored bar) and a conductive rubber layer may be used as the charging roller 12 serving as a charging member. In addition, a voltage is applied to the charging roller 12 by the charging high-voltage power source 71 serving as a voltage-applying portion. Next, the charging roller having applied thereto the voltage is brought into abutment with the photosensitive drum 11 to uniformly charge the surface of the photosensitive drum 11. A direct-current (DC) voltage is applied to the charging roller 12, and the top of the photosensitive drum 11 is uniformly charged to a charging potential Vd by the discharge of the roller. In Examples to be described later, a single-layer roller having an outer diameter of 7.5 mm and a volume resistivity of from $10^3$ Ω·cm to $10^6$ Ω·cm was used as the charging roller 12, and the DC voltage was applied thereto. In addition, the surface of the photosensitive drum was uniformly charged to −460 V (Vd: dark potential).

After the surface of the photosensitive drum 11 has been charged by the charging roller 12, the surface of the photosensitive drum 11 is irradiated with laser light 9 from an exposing unit 73. The surface potential of the surface of the photosensitive drum 11 irradiated with the laser light 9 changes to a light potential V1, and hence the electrostatic latent image is formed thereon. In Examples to be described later, the V1 was set to −100 V. As illustrated in FIG. 4, a time-series electric digital pixel signal of channel pattern information, which is input from a controller 200 to the controlling portion 202 through an interface 201 and is subjected to channel pattern processing, is input to the exposing unit 73. The exposing unit 73 includes a laser-outputting portion for outputting the laser light 9 modulated in correspondence with the time-series electric digital pixel signal to be input, a rotating polygon mirror, an fθ lens, a reflection mirror, and the like, and performs the main scanning exposure of the surface of the photosensitive drum 11 with the laser light 9. The electrostatic latent image corresponding to the channel pattern information is formed by the main scanning exposure and sub-scanning by the rotation of the photosensitive drum 11.

<Channel Pattern-Forming Process>

The channel pattern-forming unit includes a contact-separation unit 75 for controlling the position of the developing device 20, and can control the position of the developing device 20 so that the position at the time of the channel pattern formation and that at the time of non-channel pattern formation may be different from each other. The operation of the contact-separation unit 75 is controlled by the controlling portion 202 illustrated in FIG. 4.

After the start of the rotation of the photosensitive drum 11, the developing device 20 moves a developing roller 23 serving as a developer-carrying member, the roller being separated from the photosensitive drum 11, with the separation-contact unit 75 so that the roller may be brought into abutment with the photosensitive drum 11.

Subsequently, the developing roller 23 and a supplying roller 24 serving as a supplying member are driven by the motor M2 connected thereto to start to rotate in a direction indicated by an arrow C in FIG. 3 and a direction indicated by an arrow D in FIG. 3, respectively. Then, when a voltage of −300 V is applied as a developing voltage from the developing high-voltage power source 72 for the developing roller 23 to the developing roller 23, the developer (particles each containing the COC) is supplied to the electrostatic latent image formed on the photosensitive drum 11, that is, the above-mentioned V1 portion by the developing roller 23 to develop the image. The ratio (moving speed of the surface of the developing roller 23/moving speed of the surface of the photosensitive drum 11) of the moving speed of the surface of the developing roller 23 to the moving speed of the surface of the photosensitive drum 11 at this time is referred to as "developing peripheral speed ratio." The control of the developing peripheral speed ratio can control the amount of the developer to be developed onto the photosensitive drum 11. At a developing peripheral speed ratio of, for example, 2.5, when the entirety of the developer on the developing roller 23 is developed onto the photosensitive drum 11, the amount of the developer per unit area of the surface of the photosensitive drum 11 is 2.5 times as large as the amount of the developer per unit area of the surface of the developing roller 23. In this embodiment, the developing peripheral speed ratio is controlled by the speed of the motor M2 so that a developer amount suitable for the formation of a microchannel wall in a porous substrate S1 can be developed.

The developed developer image is transferred onto the porous substrate S1 serving as a recording medium by a difference in potential between the image and a transfer roller 4 having applied thereto a transfer voltage by the transfer high-voltage power source 74. The porous substrate S1, which is described later, is a sheet-shaped medium formed of a porous body.

In Examples to be described later, a roller including, on a conductive cored bar, an elastic layer formed of semiconductive sponge, which contained a NBR hydrin rubber serving as an elastic body as a main component and was subjected to resistance adjustment with an ion conductive material, was used as the transfer roller 4. The outer diameter of the transfer roller 4 was set to 12.5 mm, and the outer diameter of the conductive cored bar was set to 6 mm. In addition, the resistance value of the transfer roller used in Examples was as described below at the time of the application of +2,000 V.

Under a normal-temperature and normal-humidity environment having a temperature of 23° C. and a relative humidity of 50%: $1.0 \times 10^8$ Ω to $3.0 \times 10^8$ Ω

Under a high-temperature and high-humidity environment having a temperature of 32° C. and a relative humidity of 80%: $0.5 \times 10^8$ Ω

Under a low-temperature and low-humidity environment having a temperature of 15° C. and a relative humidity of 10%: $8.0 \times 10^8$ Ω

The porous substrate S1 having transferred thereonto the developer image is discharged to the outside of the channel pattern-forming unit while the developer image is directed upward in a gravity direction. The developer that has not been transferred is scraped off the photosensitive drum 11 after its passage through the transfer roller 4 by the cleaning member 14 brought into abutment with the drum. After that, when the process starting from the charging by the charging roller 12 is repeated again, image formation is continuously performed.

After the completion of the channel pattern formation, the developing roller 23 is separated from the photosensitive drum 11 by the contact-separation unit 75, and a post-rotation operation is performed to reset a state in the channel pattern-forming unit, thereby making preparations so that printing can be rapidly performed at the time of the performance of the next channel pattern formation. After the separation from the photosensitive drum 11 by the contact-separation unit 75, the deterioration of the developer can be suppressed by turning the driving of the motor M2 off.

Next, the operation control of the channel pattern-forming unit is described with reference to FIG. 4. The controlling portion 202 is a unit for controlling the operation of the channel pattern-forming unit, and exchanges various electric information signals. In addition, the unit processes electric information signals input from various processing instruments and a sensor, and processes command signals to the various processing instruments. The controller 200 exchanges various pieces of electric information with a host device. In addition, the controller 200 controls the channel pattern-forming operation of the channel pattern-forming unit in the controlling portion 202 through the interface 201 in an overall manner in accordance with a predetermined control program or reference table. The controlling portion 202 includes, for example, a CPU 155 that is a central element for performing various kinds of calculation processing and a memory 15 that is a memory element, such as a ROM or a RAM. The detection result of the sensor, the count result of a counter, a calculation result, and the like are stored in the RAM, and the control program, a data table obtained by an experiment or the like in advance, and the like are stored in the ROM. Various control objects in the channel pattern-forming unit, the sensor, the counter, and the like are connected to the controlling portion 202. The controlling portion 202 performs, for example, the control of a predetermined channel pattern-forming sequence by controlling, for example, the timings of the exchange of the various electric information signals, and of the driving of the respective portions. The controlling portion 202 controls, for example, the charging high-voltage power source 71, the developing high-voltage power source 72, the exposing unit 73, the transfer high-voltage power source 74, and a developing peripheral speed-changing unit 76 to adjust, for example, a voltage to be applied and an exposure amount.

In the channel pattern-forming unit of FIG. 2, connections from the controlling portion 202 to the charging high-voltage power source 71, the developing high-voltage power source 72, the exposing unit 73, and the transfer high-voltage power source 74 are not illustrated. In actuality, however, the charging high-voltage power source 71, the developing high-voltage power source 72, the exposing unit 73, and the transfer high-voltage power source 74, and the controlling portion 202 are connected to each other, and the controlling portion 202 controls the respective portions. In addition, the channel pattern-forming unit performs the channel pattern formation on the porous substrate S1 based on an electric image signal input from the host device to the controller 200. Examples of the host device include an image reader, a personal computer (hereinafter also described as "PC"), a facsimile, and a smartphone.

<Developing Device>

Next, the configuration of a portion involved in the developing process of the developing device 20 serving as an example of a developing device is described in detail with reference to FIG. 3.

The developing device 20 includes a developer container 21 having an opening portion at a position facing the photosensitive drum 11. The resin particles are stored in the developer container 21 instead of toner to be used in a typical electrophotographic apparatus.

The developing device 20 includes the developing roller 23 and the resin particle-supplying roller 24. The developing roller 23 serves to convey COC particles to the electrostatic latent image on the photosensitive drum 11 while carrying the particles. A roller obtained by arranging a surface layer having dispersed therein roughening particles on the surface of an elastic layer may be used as the developing roller 23. The conveyability of the resin particles can be adjusted by the surface roughness of the developing roller 23. In Examples to be described later, there was used a roller obtained by arranging a surface layer containing urethane rubber particles each having a diameter of 10 μm as a binder on the surface of an elastic layer formed of a silicone rubber. The surface roughness Ra of the roller was set to about 3.5 μm.

The supplying roller 24 has a foam layer for rubbing the surface of the developing roller 23, and serves to supply the COC particles in the developer container 21 to the developing roller 23. The supplying roller 24 electrically conducts to the developing roller 23 so that the rollers may have the same potential. In addition, the developing device 20 includes a developing blade 25 serving as a developer-regulating member for regulating the COC particles A supplied to the developing roller 23.

For example, a product obtained by causing a support sheet metal to support a thin stainless steel (SUS) plate may be used as the developing blade 25. The developing blade 25 electrically conducts to the developing roller 23 so that the blade and the roller may have the same potential. In Examples to be described later, a product obtained by causing a support sheet metal having a thickness of 1 mm to support a stainless steel (SUS) plate having a thickness of 80 μm was used as the developing blade 25. The tip of the SUS plate of the developing blade 25 was brought into abutment with the developing roller 23 at a pressure of from 25 g/cm to 35 g/cm. The direction of the abutment was set to a counter direction in which the tip on a free end side with respect to the abutting portion was positioned on the upstream side of the rotation direction of the developing roller 23. In the foregoing configuration, such control that the surface of the developing roller 23 after its passage through the developing blade 25 was coated with about 0.50 mg/cm' of the developer was performed.

EXAMPLES

Example 1

In this Example, resin particles (hereinafter also described as "COC particles A") produced from a cyclic olefin copolymer obtained by copolymerizing ethylene and a cyclic olefin (manufactured by Polyplastics Co., Ltd., TM grade, hereinafter also described as "COC-A") were used as a developer.

The cyclic olefin copolymer has two kinds of units (an ethylene unit and a norbornene unit) represented by the following formula (1-1). In the formula, a content ratio between "x" and "y" is 85:15 in terms of molar ratio. The formula (1-1) means that the two kinds of units are bonded to each other at a predetermined ratio, and does not mean that the copolymer has a block polymer-like configuration in which a polyethylene moiety and a polynorbornene moiety are bonded to each other.

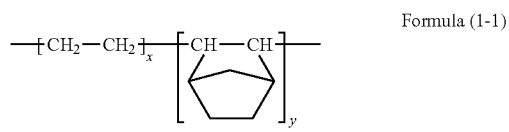

Formula (1-1)

<Channel Pattern>

Figure 5A:
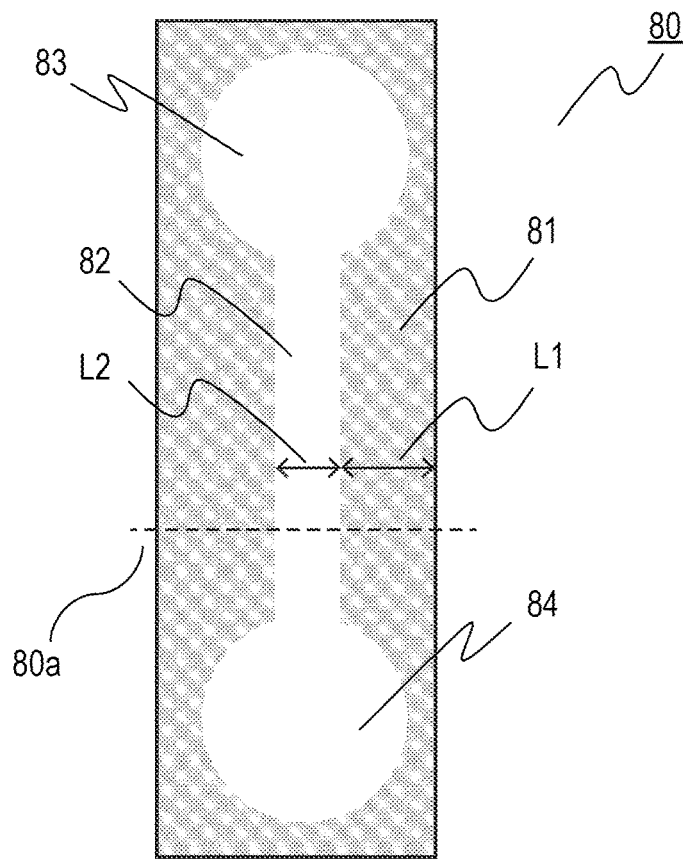
FIG. 5A is a channel pattern view.

In this Example, a channel pattern 80 illustrated in FIG. 5A was formed with a channel pattern-forming unit by mounting the COC particles A on the porous substrate S1 to form an image of the COC particles A. Respective symbols in FIG. 5A are as follows: the image 81 of the COC particles A, a reagent portion 83 to which a reagent is caused to adhere, a test liquid portion 84 to which a test liquid is caused to adhere, and a channel 82 for connecting the reagent portion 83 and the test liquid portion 84 to each other. The width L1 of each of the portions of the image 81 of the COC particles A sandwiching the channel 82 is 4 mm, and the width L2 of the channel 82 is 1.5 mm. However, the shape, size, and the like of the channel pattern are of course not limited thereto, and a shape using the combination of a straight line and a curve, or a branch may be adopted, and the width of the channel may be changed.

Figure 5B:
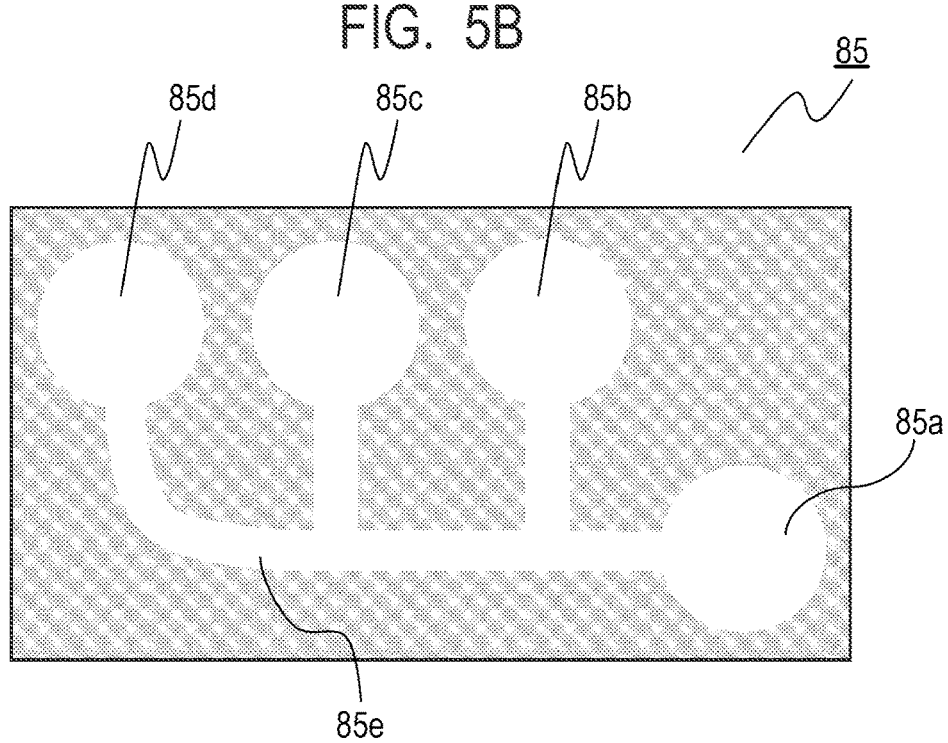
FIG. 5B is another channel pattern view.

An example of a channel pattern having a curve and a branch is illustrated in FIG. 5B. In this example, reagent portions 85a, 85b, and 85c to each of which a reagent is caused to adhere, and a test liquid portion 85d to which a test liquid is caused to adhere are connected to each other by a channel 85e.

<Heating Process>

The porous substrate S1 having formed thereon the channel pattern 80 passes through a heating process by a heating unit. When the substrate passes through the heating process, the COC particles A melt to permeate the porous substrate S1, thereby forming a microchannel device including a channel surrounded by hydrophobic walls.

A heating temperature needs to be set to the temperature at which the COC particles A melt to permeate the porous substrate S1. In the configuration of this Example, the COC particles A permeated the porous substrate S1 at 140° C. or more.

A heating time needs to be the time period for which the molten COC particles A completely permeate in the thickness direction of the porous substrate S1. However, when the heating time is excessively long, the particles diffuse to an extent more than necessary, and hence the channel 82 after the heating process may be thinner than the formed channel pattern. In the configuration of this Example, a moderate channel wall was able to be formed by setting the heating time to from 1 minute to 10 minutes.

In view of the foregoing, heating conditions in this Example were set as follows: the porous substrate S1 was heated in an environment at 200° C. for 2 minutes. An oven (Yamato Scientific Co., Ltd., FORCED CONVECTION OVEN DN610H) was used as the heating unit. However, a heating system is not limited thereto, and a far infrared heater, a hot plate, or the like may be used, and the heating conditions should be selected in accordance with the physical properties of the COC particles A and the porous substrate S1.

The heating process under the above-mentioned conditions is described with reference to FIG. 1A and FIG. 1B.

Figure 1A:
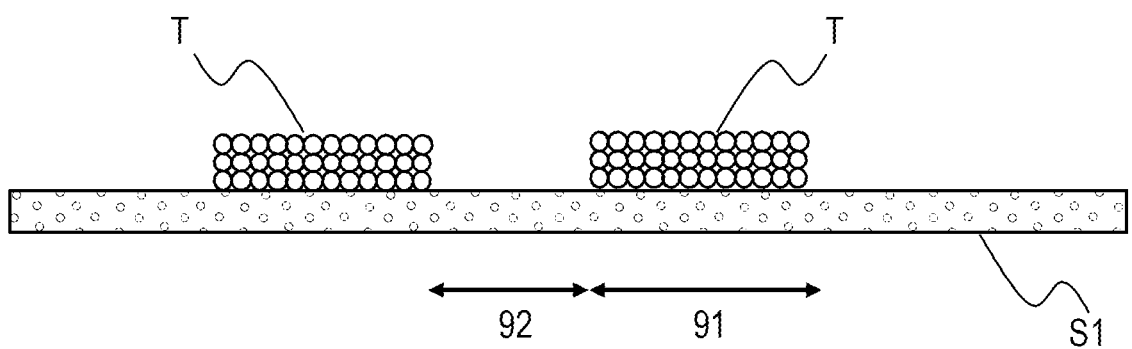
FIG. 1A is a sectional view of a microchannel device formed by causing a COC-A to permeate a porous substrate S1 before its heating.
Figure 1B:
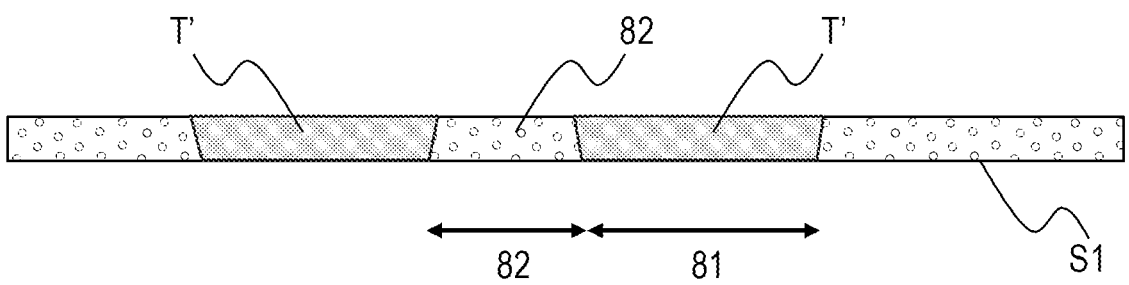
FIG. 1B is a sectional view of the microchannel device formed by causing the COC-A to permeate the porous substrate S1 after the heating.

As views for illustrating the COC particles A before and after the heating, schematic sectional views at a position represented by a broken line 80a in FIG. 5A are illustrated in FIG. 1A and FIG. 1B. FIG. 1A is a sectional view before the heating, and FIG. 1B is a sectional view after the heating.

As illustrated in FIG. 1A, the COC particles A at the time of the formation of the channel pattern are in the state of merely adhering to the surface of a region 91 serving as the channel wall 81 of the porous substrate S1, and resin particles T do not adhere to a region 92 serving as the channel 82. The resin particles T (COC particles A) are melted by subsequent heating, and the molten resin particles T permeate into the porous substrate S1 by virtue of its capillary action.

After the heating at 200° C. for 2 minutes, as illustrated in FIG. 1B, the hydrophobic COC particles A permeate in the thickness direction of the porous substrate S1, and hence the channel 82 sandwiched between permeated resins T' after the melting is formed in the porous substrate S1.

As described above, the microchannel device including, in the porous substrate S1, the channel surrounded by the hydrophobic walls can be produced by using the channel pattern-forming unit and the heating unit.

When the microchannel device produced based on the channel pattern of FIG. 5A is used, for example, a chemical that shows a color reaction is caused to adhere to the reagent portion 83, and then the test liquid is caused to adhere to the test liquid portion 84. The adhered test liquid passes through the channel 82 to diffuse to the reagent portion 83. A test device or a tester only needs to recognize a color reaction or the like occurring at that time. In the case of, for example, a blood glucose level test, blood is used as the test liquid, and a mixed liquid of an oxidase, a peroxidase, and potassium iodide may be used as the reagent. In the case of a uric acid level test, blood is used as the test liquid, and a mixed liquid of a uricase, a peroxidase, and 4-aminoantipyrine may be used as the reagent.

A usage example of a microchannel device produced based on the channel pattern of FIG. 5B is described. A reagent "a" is caused to adhere to the reagent portion 85a, a reagent "b" is caused to adhere to the reagent portion 85b, and a reagent "c" is caused to adhere to the reagent portion 85c. After that, the test liquid is caused to adhere to the test liquid portion 85d. In that case, the test liquid caused to adhere to the test liquid portion 85d permeates the channel 85e. However, the channel branches in midstream, and hence the test liquid reacts only with the reagent "a" in the reagent portion 85a, reacts only with the reagent "b" in the reagent portion 85b, and reacts only with the reagent "c" in the reagent portion 85c. The reactions to the plurality of reagents can be simultaneously tested by using the branched channel. In addition, when the channel is formed into a curve like the channel in a portion toward the test liquid portion 85d, the accumulation of the test liquid in an edge portion can be eliminated or reduced.

<COC Particles A>

The COC-A used as a material for the resin particles in this Example shows extremely low water absorptivity, and hence such problems as the exudation of a specimen or a test liquid to the outside of the channel and the swelling of the channel at the time of its use under a high-humidity environment hardly occur. In addition, the COC-A has high mechanical strength, and hence even when the channel is formed in a porous substrate that easily deforms at the time of the use of the device, such as filter paper, the cracking or the like of a channel wall due to the deformation hardly occurs.

Further, the COC-A has high human body safety because the COC-A does not produce any substance harmful to a human body at the time of the formation of a channel wall shape by its melting.

<Solvent Resistance>

Next, the solvent resistance of the COC-A is described. A microchannel device is utilized by causing various specimens and test liquids to permeate into a channel thereof through a capillary action. If a channel wall is compatible with such specimen or test liquid to swell or to cause a chemical change, the structure of the channel collapses to inhibit an appropriate capillary action or to change the characteristics of the specimen or the test liquid. Accordingly, it becomes difficult to obtain a correct test result.

In, for example, a blood glucose level test in a medical test, a hydrogen peroxide solution that is acidic is utilized as a test drug. In addition, in a food additive test, sodium nitrite that serves as a color former to show alkalinity or an ester-based compound to be utilized as an emulsifying agent may be used as a specimen. As described above, a paper microanalysis device is required to use various solvents including acidic, alkaline, and ester-based solvents as specimens or test liquids, and hence it is important for an analysis device having wide applicability to have solvent resistance against these solvents.

The results of the solvent resistance of each of the COC-A and the other resin materials are shown in Table 1.

Each resin pellet (having a diameter of 3.5 inches and a thickness of 1 mm) was completely immersed in each solvent for 1 hour under the conditions of a temperature of 23° C. and a relative humidity of 50%. After the immersion, a case in which the pellet dissolved or obvious swelling of the pellet was observed was evaluated as NG.

TABLE 1

| | Kind of resin | | | |
|---|---|---|---|---|
| | COC-A | Polystyrene | Polycarbonate | UV-curable ink |
| Acid: 35% hydrochloric acid | OK | OK | OK | OK |
| Alkali: a 40% aqueous solution of sodium hydroxide | OK | OK | NG | OK |
| Alcohol: 95% ethanol | OK | NG | NG | NG |
| Methyl ethyl ketone | OK | NG | NG | NG |
| Ester | OK | NG | NG | NG |

The UV-curable ink is an acrylic resin-based UV-curable ink, and is more specifically as described below.

The ink is formed of a mixture of octadecyl acrylate serving as a photoradical polymerizable monomer and 1,10-bis(acryloyloxy)decane serving as a photoradical polymerizable oligomer.

The COC-A has resistance not only against an acid and an alkali but also against a wide variety of solvents, such as an alcohol, a ketone, and an ester, and hence can be utilized as a microchannel device, which is adaptable to various specimens and test liquids, and thus has high applicability.

<Hydrophobicity>

A pellet of each resin (having a diameter of 3.5 inches and a thickness of 1 mm) is produced, and a change in mass of the resin when the pellet is immersed in distilled water at a temperature of 23° C. for 24 hours is shown as a water absorption ratio in Table 2.

TABLE 2

| | COC-A | Polystyrene | Polycarbonate | UV-curable ink |
|---|---|---|---|---|
| Water absorption ratio (%) | ~0.01 | 0.03 | 0.2 | 0.3 |

As shown in Table 2, the COC-A has hydrophobicity higher than that of each of the general channel wall materials.

A method of producing the COC particles A through use of the COC-A having the above-mentioned features is described. The COC particles A are particles obtained by: pulverizing the resin pellet of the COC-A; classifying the pulverized pieces so that their volume-average particle diameter may be 6 μm; and then thermally sphering the classified pieces. Hydrophobic silica fine particles each having a particle diameter of 10 nm are externally added as an external additive at 1.6 mass % to the surfaces of the particles. When the surfaces of the COC particles A are coated with the external additive, the negative charging performance thereof is improved, and a fine gap can be arranged between the COC particles A to improve fluidity. Thus, stable channel pattern formation is achieved. The silica fine particles to be used as the external additive are subjected to hydrophobic treatment and their external addition amount is a trace amount, and hence a channel at the time of its final use as a microchannel device is not affected. However, the external addition amount and the substance to be externally added are not limited thereto, and may be appropriately selected in accordance with the configuration of a developing apparatus, such as a developer-carrying member or developer-regulating member to be used.

<Porous Substrate>

A substrate showing a moderate porosity and moderate hydrophilicity is suitable as the porous substrate S1. For example, an open cell structure and a network (e.g., nanofiber) structure are each desired as a porous structure, and examples of a product having such structure include filter paper, plain paper, woodfree paper, watercolor paper, Kent paper, synthetic paper, a synthetic resin porous film, cloth, and a fiber product. Of those, filter paper is preferred because the filter paper has a high porosity and satisfactory hydrophilicity.

The porosity, which may be appropriately selected in accordance with purposes, is preferably from 20% to 90%. When the porosity falls within the range, both of strength as the substrate and the permeability of a sample liquid are satisfactorily achieved.

Hydrophilicity is a property required for enabling a water-containing biological fluid, such as blood, urine, or saliva, serving as the sample liquid to diffuse in the substrate.

A substrate having an average thickness of from 0.01 mm to 0.3 mm is generally used as the porous substrate. When the average thickness is 0.01 mm or more, the strength as the substrate is appropriate. When the average thickness is 0.3 mm or less, the COC easily permeates the substrate to facilitate the formation of a channel wall. However, the average thickness only needs to be selected in accordance with applications, and a substrate having an average thickness as thick as about 0.6 mm may be used.

The channel wall (hydrophobic wall) is formed by causing the resin to permeate the pores of the porous substrate to embed the pores with the resin. Accordingly, to provide a channel suppressed from causing leakage and exudation, it is preferred that the pores of the porous substrate be sufficiently embedded with the resin.

In this Example, filter paper formed of any one of three kinds of porous substrates S1-1, S1-2, and S1-3, which were formed of cellulose fibers each having a thickness of 20 μm and were different from each other in basis weight, was used as the porous substrate S1. Details are shown in Table 3.

An apparent density (g/cm$^3$) was calculated as (basis weight/thickness×1,000), and a porosity (%) was calculated as ((true density−apparent density)/true density×100).

TABLE 3

| | Basis weight (g/m$^2$) | Thickness (mm) | Apparent density (g/cm$^3$) | True density (g/cm$^3$) | Porosity (%) |
|---|---|---|---|---|---|
| S1-1 | 80 | 0.08 | 1.00 | 1.5 | 33 |
| S1-2 | 55 | 0.08 | 0.69 | 1.5 | 54 |
| S1-3 | 30 | 0.08 | 0.38 | 1.5 | 75 |

<Bending Resistance Evaluation>

A bending resistance evaluation was performed by using a microchannel device formed by using the COC particles A in each of the porous substrates S1-1 to S1-3 according to the channel pattern of FIG. 5A so that the amount of the COC in a channel wall portion became 2.0 mg/cm$^2$.

The microchannel device was bent into two at the position represented by the broken line 80a of FIG. 5A, and a weight of 500 g (load area: 24 mm×24 mm) was placed from above the device, followed by the reciprocation of the weight at the bent portion ten times. The bent portion was opened, and the presence or absence of the breakage of the channel portion of the device was observed with naked eyes. After that, water was caused to permeate the channel, and was evaluated for its exudation. None of the breakage and the exudation was observed in the microchannel device formed of the COC particles A.

<Viscoelastic Characteristics of COC>

The COC to be used at the time of the formation of the channel preferably has predetermined viscoelastic characteristics (a storage modulus G' and a loss modulus G").

The storage modulus G' represents the elasticity of a body, and a lower storage modulus means that the body is deformed by a constant load to a larger extent. In other words, a state in which the storage modulus G' is lower means that when a permeation force by a capillary action acts on the porous substrate S1, the COC more easily permeates the substrate.

The loss modulus G" represents the viscosity of a body, and a higher loss modulus means that the body has higher viscosity (is in a stickier state). The higher viscosity means that when the velocity of a fluid varies from point to point in its flow, the property by which the velocity is smoothed so as to be uniform is stronger. In other words, a state in which the loss modulus G" is higher means that when the COC permeates the porous substrate S1, the COC tries to move at the same velocity as that of its surrounding resin, and hence its permeation unevenness in the porous substrate S1 is smaller, that is, the COC more hardly bleeds. Unevenness may occur in the capillary force of the porous substrate owing to, for example, the temperature unevenness of the porous substrate or the size unevenness of the pores of the porous substrate to make the channel pattern thereof blurred. Accordingly, the COC is preferably in the state of having so high viscosity as to hardly bleed at the temperature of its fixation process.

In other words, a resin for forming a channel wall is preferably a resin that is brought into such a molten state as to have the loss modulus G" at which its bleeding is suppressed while having the storage modulus G' at which the resin permeates the porous substrate S1 in the temperature region of its fixation process. In a general resin material, however, at the temperature at which the resin material shows the storage modulus G' at which the resin material can permeate the substrate, its loss modulus G" becomes excessively low, and in contrast, at the temperature at which the resin material shows the loss modulus G" at which its bleeding is suppressed, its storage modulus G' becomes excessively high. The COC is excellent in this regard, and has such a temperature region that both of its storage modulus G' and loss modulus G" have suitable values. At 200° C., the COC-A has a storage modulus G' as low as 0.4 Pa and a loss modulus G" as high as 10 Pa, and hence has suitable melting characteristics. Detailed physical properties are described later.

Next, viscoelastic characteristics required for the resin that is melted in the heating process to be capable of quickly permeating the porous substrate S1 without bleeding are described with reference to FIG. 6A and FIG. 6B.

Figure 6A:
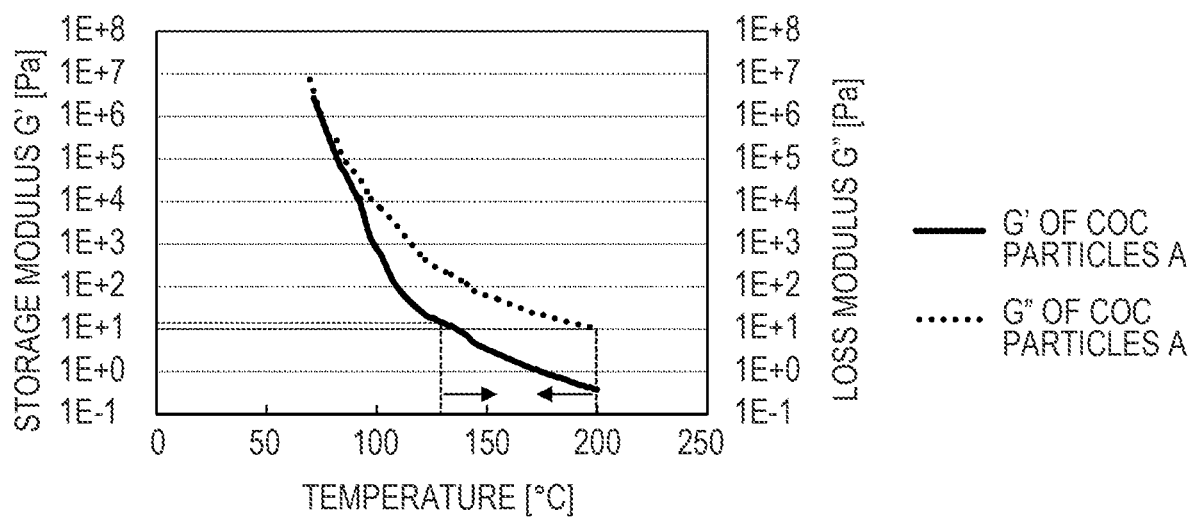
FIG. 6A is a temperature dependence graph of each of the storage modulus and loss modulus of the COC-A.
Figure 6B:
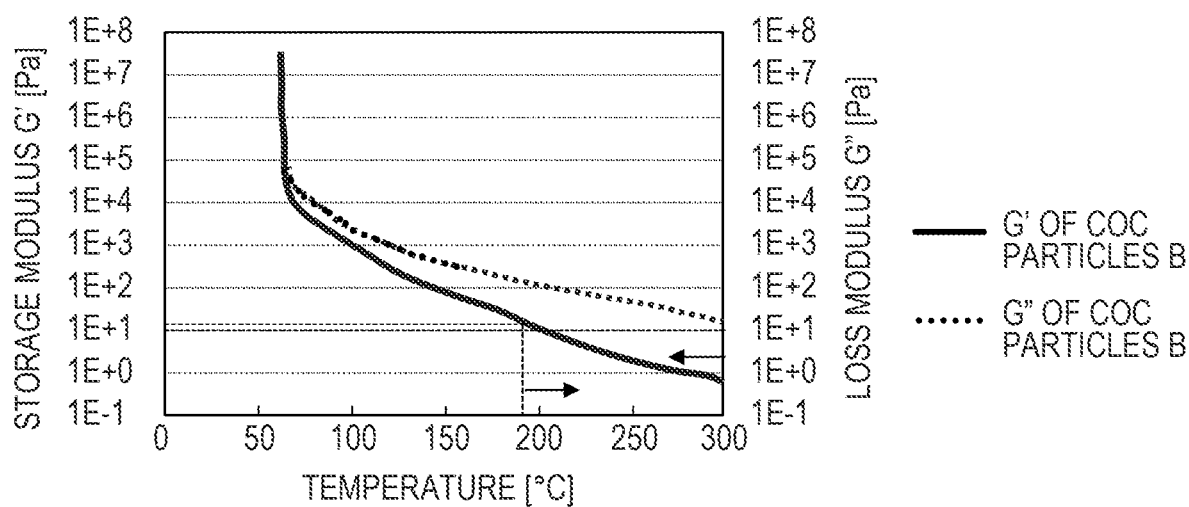
FIG. 6B is a temperature dependence graph of each of the storage modulus and loss modulus of a COC-B.

In each of FIG. 6A and FIG. 6B, such description as "1E+3" represents "1×10$^3$". The solid line of FIG. 6A represents the storage modulus G' of the COC particles A when their temperature is changed, and the dotted line of FIG. 6A represents the value of the loss modulus G" of the COC particles A when the temperature is changed.

At the time of the measurement of the elastic moduli, first, the COC particles A were set in a die for pellet molding having an outer diameter of 20 mm, and a load of 15 tons was applied to the die with a pressurizer while the amount of the COC particles A was adjusted so that a pellet thickness after the pressurization became 1 mm. Thus, a pellet was produced. Next, the produced pellet (having a diameter of 20 mm and a thickness of 1 mm) was fixed between the lower plate and upper plate of a rotary viscoelasticity-measuring apparatus AR-G2 (manufactured by TA Instruments, Inc.). A shear stress of 10 Pa was applied from the upper plate to the pellet at a cycle of 1 Hz, and the storage modulus G' and the loss modulus G" were calculated from a phase difference between the applied shear stress and a shear stress serving as a response at that time. The foregoing measurement was performed in the temperature range of from 70° C. to 200° C. while the temperature of a space between the plates was changed at a rate of 2° C./min.

First, as can be seen from the storage modulus G' represented by the solid line of FIG. 6A, as the temperature increases, the COC particles A melt at a temperature more than their glass transition point Tg, and hence the storage modulus G' rapidly reduces. The storage modulus becomes less than 14 Pa at 130° C., and becomes 0.4 Pa at 200° C. As the storage modulus G' becomes smaller, as described above, the particles start to permeate into the porous substrate S1 by virtue of the capillary action by the porous substrate S1. In the configuration of this Example, the heating process is preferably performed at a temperature of 130° C. or more because the COC permeated the porous substrate S1 at not less than 130° C. at which the storage modulus G' became 14 Pa or less.

Meanwhile, the value of the loss modulus G" represented by the dotted line of FIG. 6A also reduces with increasing temperature, but is about 10 Pa at 200° C., that is, the COC particles A are in a highly viscous state. When the loss modulus G" is 10 Pa or more, the bleeding of the particles is sufficiently suppressed to a low level. Accordingly, the temperature in the heating process is preferably 200° C. or less from the viewpoint of the loss modulus G".

In other words, in this case, the heating temperature in the heating process preferably falls within the range of from 130° C. to 200° C. The results of a test in which channel formation was performed while the heating temperature was changed are shown in Table 4. The porous substrate S1-2 was used as a porous substrate.

TABLE 4

| Kind of resin | Heating temperature (° C.) at time of channel formation | G' (Pa) at heating temperature | G" (Pa) at heating temperature | Permeation into porous substrate | Bleeding at time of permeation |
|---|---|---|---|---|---|
| COC particles A | 200 | 0.4 | 10 | OK | OK |
| COC particles A | 130 | 14 | 240 | OK | OK |
| COC particles A | 120 | 32 | 640 | Insufficient permeation | — |

As shown in Table 4, when the COC particles A were used, satisfactory channels were formed at heating temperatures of 130° C. and 200° C., but at a heating temperature of 120° C., the storage modulus G' was high, and hence the permeation into the porous substrate was insufficient, thereby making it difficult to form a channel.

SUMMARY

As described above, according to the present invention, a microchannel produced from the COC-A can achieve a microchannel device, which shows high hydrophobicity, high mechanical strength, human body safety, and high solvent resistance to enable the use of a wide variety of specimens and test drugs, and thus has wide applicability.

The COC is not limited to that used in this Example.

In addition, when a material, such as paper or cloth, is used as the substrate, there can be achieved a microchannel device, which can be used at low cost and in an environment without electricity, is easy to carry and dispose of, and eliminates the need for its maintenance.

In this Example, the COC particle image was formed on the porous substrate S1 by an electrophotographic system. However, a channel pattern-forming system is not limited thereto. The COC particle image may be produced on the porous substrate S1 by, for example, a thermal transfer system, though the system is inferior in productivity to the electrophotographic system. In that case as well, a microchannel device having formed therein a channel surrounded by the COC can be obtained by performing a heating process satisfying the following conditions: the storage modulus G' is low to the extent that the molten resin permeates the substrate by virtue of the capillary action; and the loss modulus G" is high to the extent that the bleeding does not occur.

Example 2

A COC-B (COC manufactured by Polyplastics Co., Ltd.: 8007F-600 grade) was used instead of the COC-A used in Example 1. Further, 100 parts by mass of the COC-B was kneaded with 50 parts by mass of a plastic component (PARAFFIN WAX HNP-51 (Nippon Seiro Co., Ltd.)) to provide a kneaded resin. Resin particles (COC particles B) were obtained by using the kneaded resin in the same manner as in Example 1.

When the COC-B is used alone, a temperature region in which its storage modulus G' becomes 14 Pa or less does not exist at temperatures up to 300° C. However, when the COC-B is mixed with the paraffin wax as a plastic component, the temperature region in which the storage modulus G' becomes 14 Pa or less starts to exist. Specifically, resin particles having viscoelasticity shown in FIG. 6B were obtained. In this case, a state in which a storage modulus of 14 Pa or less and a loss modulus of 10 Pa or more are satisfied is established in the range of from 195° C. to 300° C.

In general, materials having close solubility parameters (hereinafter referred to as "SP values") have high affinities for each other, and hence mix well with each other. When such a plastic component that the absolute value of a difference in SP value between the component and the COC is 3.5 or less is used, the viscoelasticity of the COC can be suitably controlled. The SP values may be determined by the Fedors method. In the combination of this Example, the absolute value of the SP value difference is 1.56.

A channel wall for forming the channel pattern of FIG. 5A was formed on the porous substrate S1 in the same manner as in Example 1 except that: the COC particles B were used; and the heating temperature in the heating process was set to 200° C. As shown in Table 5, even when the COC particles B were used, the particles permeated the porous substrate S1 without bleeding to form a satisfactory channel wall. The porous substrate S1-2 was used as the porous substrate.

TABLE 5

| Kind of resin | Heating temperature (° C.) in heating process | G' (Pa) at heating temperature | G" (Pa) at heating temperature | Permeation into porous substrate | Bleeding at time of permeation |
|---|---|---|---|---|---|
| COC particles B | 200 | 9.98 | 116 | OK | OK |

In addition, when the COC and the plastic component are used in combination, such a characteristic that the channel wall hardly cracks starts to be exhibited. Accordingly, the channel wall formed by using the COC particles B hardly cracks even at the time of its deformation. A COC that softens at a temperature relatively higher than that in the case where the COC is used alone is used as the COC to be used when the COC is used in combination with the plastic component. The deformation ratio (rupture elongation) of such COC is generally large until its rupture, and hence the channel wall formed by using the COC and the plastic component in combination is considered to hardly crack.

The plastic component may be a wax except the paraffin wax, and in addition to the wax, a crystalline resin, an oil, or the like may be used.

<Durability Evaluation>

The durability of the channel pattern as a microchannel device was evaluated by paying attention to the cracking resistance thereof.

The produced channel pattern is wound around a metal cylinder having a predetermined diameter, and then both the ends of the resultant are pulled with a force of 4.9 N, followed by the observation of whether or not a crack occurs in the channel pattern. The diameter of the cylinder is gradually reduced, and the evaluation is repeatedly performed until a crack is observed in the channel pattern.

In the microchannel device having a thickness of 0.08 mm produced in Example 2, no crack was observed when the device was wound around the cylinder having a diameter of 4 mm or more, and a crack was observed for the first time when the device was wound around the cylinder having a diameter of 3 mm. In addition, in a microchannel device similarly produced by using the COC particles A used in Example 1, a crack was observed when the device was wound around the cylinder having a diameter of 12 mm. The rupture elongation of the COC-A is 1.3, and the rupture elongation of the COC-B is 4.5.

Example 3

In Example 3, a microchannel device having arranged therein a protective layer for covering a channel formed by using a COC is produced. The protective layer is a cover for covering a channel portion present between channel walls. Thus, the channel can be turned into a closed system, and hence the drying of a sample liquid can be prevented and the adhesion of the sample liquid to a hand can be prevented. Accordingly, an improvement in safety can be expected.

In this Example, a material for forming the channel walls and a material for forming the protective layer were the same material. In this case, adhesiveness between the channel walls and the protective layer is improved to provide a channel device having a high hermeticity. When a microchannel device including channel walls and a protective layer that are formed of the same material is produced, a process for forming the protective layer and a process for forming the channel walls are separately performed.

In Example 3, a porous substrate having a cover film (polyethylene terephthalate (PET) film; manufactured by Toray Industries, Inc., LUMIRROR S10, thickness: 50 µm) (hereinafter referred to as "PET film B") bonded as a supporting base to one surface thereof was used. The bonding of the cover film can suppress, for example, drying and contamination on the bonded side of the substrate. The average thickness of the cover film is preferably 0.01 mm or more and 0.5 mm or less from the viewpoint of achieving both of the strength and flexibility thereof.

A material for the cover film is not particularly limited, and may be appropriately selected in accordance with purposes. Examples thereof include: a polyester, such as polyethylene terephthalate (PET) or polyethylene naphthalate (PEN); polycarbonate; a polyimide resin (PI); polyamide; polyethylene; polypropylene; polyvinyl chloride; polyvinylidene chloride; polystyrene; a styrene-acrylonitrile copolymer; and cellulose acetate. Those materials may be used alone or in combination thereof. Of those, polyethylene terephthalate (PET) or polyethylene naphthalate (PEN) is particularly preferred.

Figure 7A:
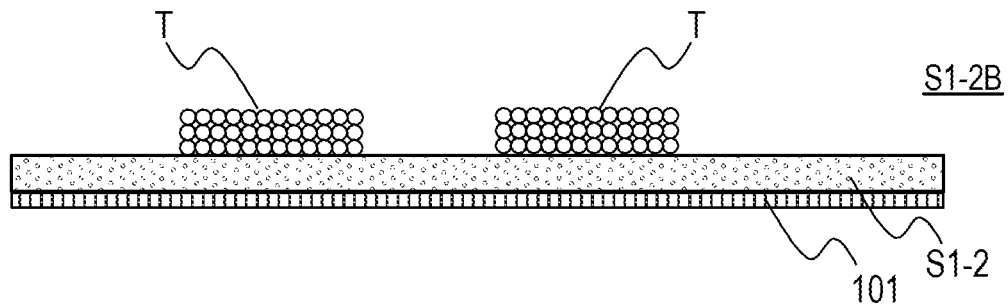
FIG. 7A is a view for illustrating the formation flow of a microchannel device including a protective layer.
Figure 7B:
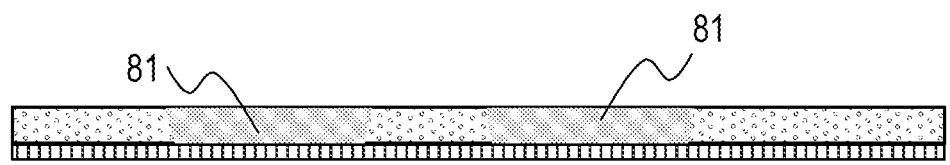
FIG. 7B is a view for illustrating the formation flow of the microchannel device including the protective layer.

First, the resin particles T (COC particles A) were mounted on the surface of the porous substrate S1-2 to which the PET film B was not bonded in the same manner as in Example 1, and the particles were melted and caused to permeate the substrate to form the channel walls 81 so that the channel pattern of FIG. 5A was obtained (FIG. 7A and FIG. 7B).

Figure 7C:
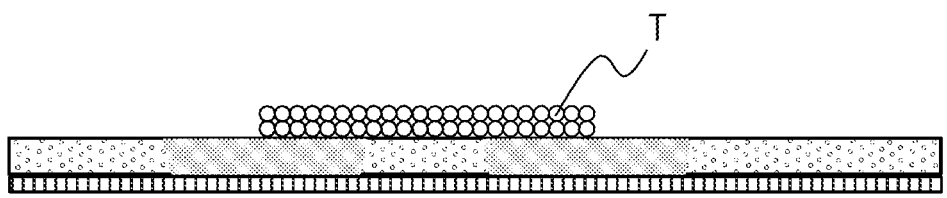
FIG. 7C is a view for illustrating the formation flow of the microchannel device including the protective layer.
Figure 7D:
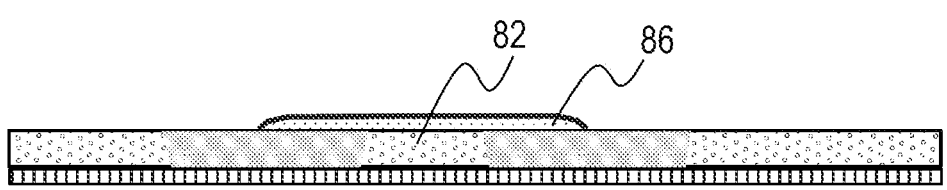
FIG. 7D is a view for illustrating the formation flow of the microchannel device including the protective layer.

Next, the resin particles T (COC particles A) were caused to pass through a channel pattern-forming process to be mounted on a position corresponding to the channel 82 in FIG. 5A so that the channel was covered with the particles (FIG. 7C). Next, heating was performed at 120° C. for 2 minutes. The COC-A does not sufficiently melt at the temperature, and hence the channel in the porous substrate is maintained. Meanwhile, the COC particles A mounted on the surface of the porous substrate melt on the surface without permeating into the substrate. As a result, a protective layer 86 is formed so as to cover the channel 82 (FIG. 7D).

In this Example, the protective layer was arranged in one surface side portion of the porous substrate, and the cover film was bonded to the other surface thereof. However, the protective layer may be formed on each of both the surfaces thereof by using the COC.

In addition, in this Example, the resin for forming the channel walls and the resin for forming the protective layer were the same resin. However, the resins may be different from each other. When different resins are used, a second hydrophobic resin is preferably used for preventing an influence of water.

Example 4

In Example 3, the protective layer was formed on the surface of the porous substrate. However, the protective layer may be formed so that a ceiling may be arranged in the upper portion of a channel. In Example 4, such microchannel device is produced.

Figure 8A:
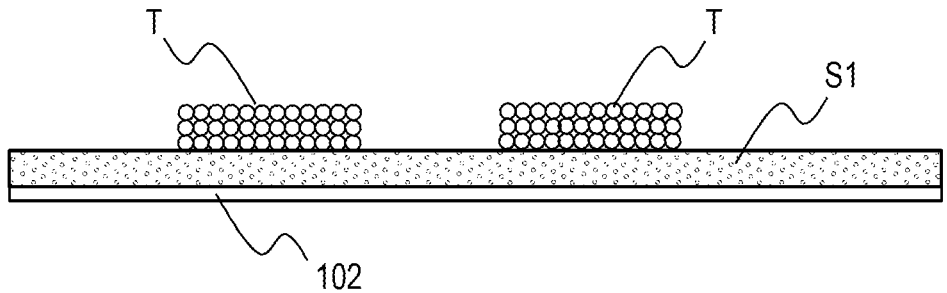
FIG. 8A is a view for illustrating another formation flow of the microchannel device including the protective layer.
Figure 8B:
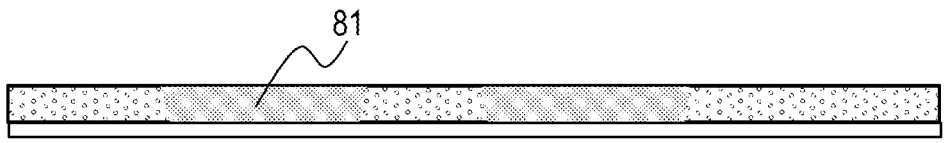
FIG. 8B is a view for illustrating another formation flow of the microchannel device including the protective layer.

First, a cover film was bonded to one surface of the porous substrate S1. Next, the resin particles T (COC particles A) were mounted on the other surface of the porous substrate S1 in the same manner as in Example 1. Then, the COC particles A were melted and caused to permeate the porous substrate S1 to form the channel walls 81 so that the channel pattern of FIG. 5A was obtained (FIG. 8A and FIG. 8B).

Figure 8C:
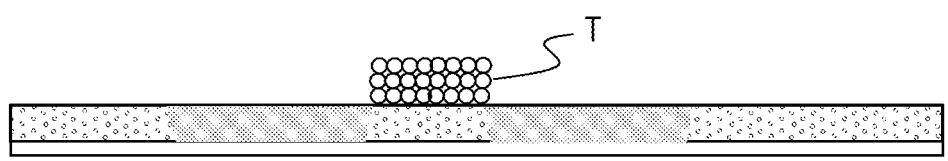
FIG. 8C is a view for illustrating another formation flow of the microchannel device including the protective layer.
Figure 8D:
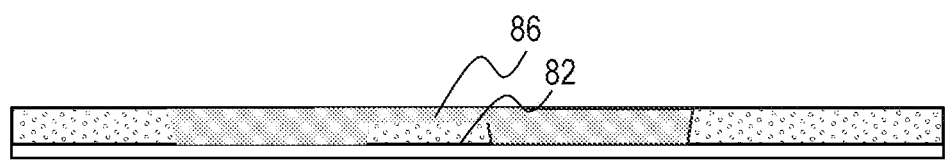
FIG. 8D is a view for illustrating another formation flow of the microchannel device including the protective layer.

Next, the resin particles T (COC particles A) were caused to pass through a channel pattern image-forming process to be mounted on a portion corresponding to the channel 82 in FIG. 5A (FIG. 8C). Next, heating was performed at 120° C. for 30 seconds. Sufficient permeation of the particles does not occur within the heating time, and hence the protective layer 86 is formed in the upper portion of the channel (FIG. 8D). The heating time may be appropriately adjusted in accordance with the materials to be used and the thickness of the protective layer to be formed.

Figure 9A:
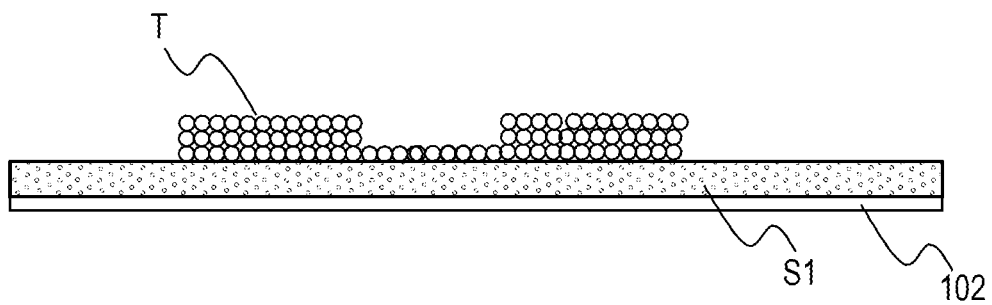
FIG. 9A is a view for illustrating another formation flow of the microchannel device including the protective layer.
Figure 9B:
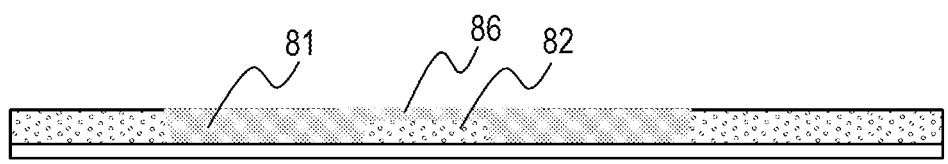
FIG. 9B is a view for illustrating another formation flow of the microchannel device including the protective layer.

In Example 4, the protective layer was formed by changing the heating time. However, the protective layer 86 for protecting the channel 82 may be formed by reducing the amount of the resin particles T (COC particles) to be mounted on the channel portion to reduce the permeation amount thereof (FIG. 9A and FIG. 9B).

Example 5

In this Example, a microchannel device in which a cover layer reduced in print percentage is arranged on the surface of a test liquid portion is produced. The protective layers in the above-mentioned Examples were each formed as a solid image having a print percentage of 100%. However, when the cover layer is arranged on the surface of the test liquid portion, the print percentage is appropriately adjusted in the range of from 10% to 90%. The arrangement of the cover layer on the surface of the test liquid portion can control the amount of a test liquid flowing into the test liquid portion. When the inflow amount of the test liquid is to be largely reduced, the print percentage of the cover layer only needs to be increased, and when the inflow amount is to be slightly reduced, the print percentage of the cover layer only needs to be reduced.

A specific example of the microchannel device in which the cover layer is arranged in the test liquid portion is described below.

First, a microchannel device having the channel pattern of FIG. 5B was produced under the same conditions as those of Example 1.

Figure 10:
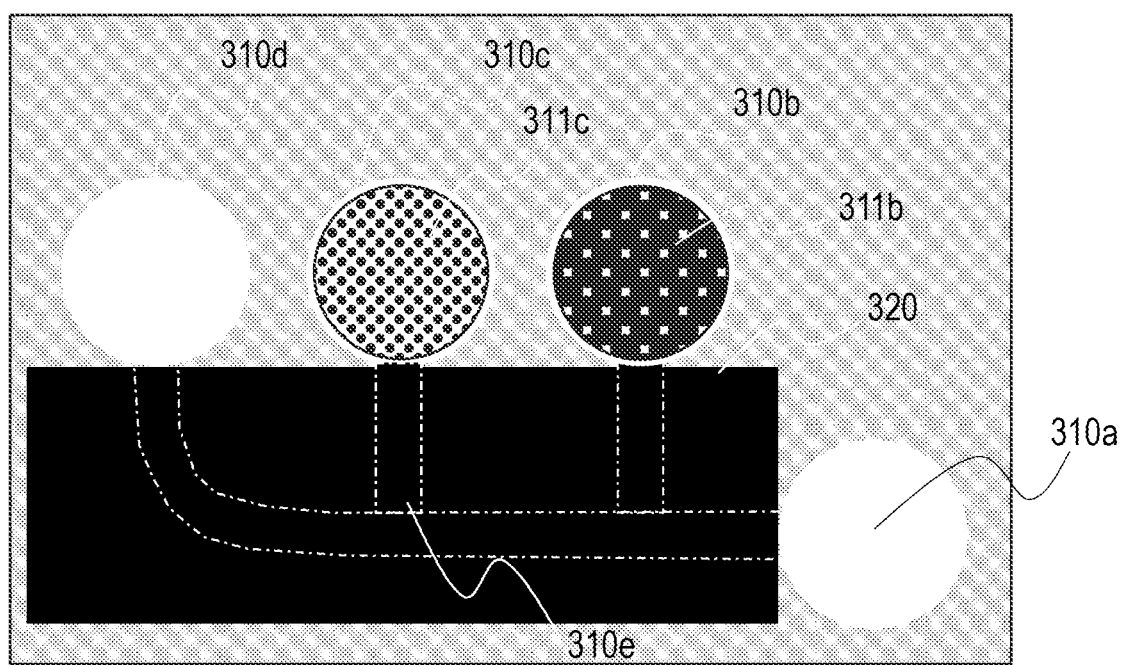
FIG. 10 is a view for illustrating a microchannel device including a protective layer and a cover layer.

Next, a microchannel device illustrated in FIG. 10 was produced as described below. First, COC particles for a protective layer were mounted at a print percentage of 100% so as to cover a channel in the same manner as in the step of forming the protective layer in Example 3, COC particles for a cover layer were mounted at a print percentage of 50% on a test liquid portion 310c, and the COC particles for a cover layer were mounted at a print percentage of 80% on a test liquid portion 310b. After that, heating was performed at 120° C. for 2 minutes to form a protective layer (310e) and cover layers (311b and 311c) on the surface of the porous substrate (FIG. 10).

The microchannel device may be used in the following manner: when a large amount of the test liquid is required, the test liquid is caused to adhere from a test liquid portion 310d; and in contrast, when the inflow amount of the test liquid is to be a small amount, for example, about one half of that described above, the test liquid is caused to adhere from the test liquid portion 310c. When the pattern of the protective layer printed in the test liquid portion is a pattern having a print percentage of 50%, the inflow amount is one half of that in the test liquid portion 310d, and when the pattern is a pattern having a print percentage of 80%, the inflow amount is about 20% thereof.

According to the present invention, the microchannel device, which has not only high hydrophobicity, high mechanical strength, and human body safety but also solvent resistance against an organic solvent or the like, and thus has wide applicability, can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A microchannel device comprising a porous substrate, wherein a channel and channel walls are present in the porous substrate, wherein the channel is disposed in an area of the porous substrate, which is sectioned by the channel walls, wherein the channel walls are hydrophobic and are configured to be formed by embedding at least one pore of the porous substrate with a resin, and the resin is configured to permeate the at least one pore and suppress leakage, wherein the channel is sandwiched between the resin, and the resin is configured to not adhere to a region of the channel disposed between the resin, and wherein each of the channel walls contains a cyclic olefin copolymer that is a copolymer of an alkene and a cyclic olefin.

2. The microchannel device according to claim 1, wherein the cyclic olefin is a cyclic olefin having a crosslinked structure.

3. The microchannel device according to claim 2, wherein the alkene is ethylene, and wherein the cyclic olefin is norbornene.

4. The microchannel device according to claim 1, wherein the porous substrate has a porosity of from 20% to 90%.

5. The microchannel device according to claim 1, wherein each of the channel walls in the porous substrate further contains a plastic component.

6. The microchannel device according to claim 5, wherein the plastic component is at least one component selected from the group consisting of a crystalline resin, a wax, and an oil.

7. The microchannel device according to claim 5, wherein the plastic component is a material having a storage modulus lower than a storage modulus of the cyclic olefin copolymer.

8. The microchannel device according to claim 5, wherein an absolute value of a difference in solubility parameter between the cyclic olefin copolymer and the plastic component is 3.5 or less.

9. The microchannel device according to claim 1, further comprising a protective layer in at least one surface side portion of a channel formed by being sandwiched between the channel walls.

10. The microchannel device according to claim 1, further comprising:

a protective layer formed on a surface of the channel between the channel walls on one side of the channel; and a supporting base covering the channel on another side of the channel.

11. The microchannel device according to claim 9, wherein the protective layer contains a cyclic olefin copolymer that is a copolymer of an alkene and a cyclic olefin.

12. The microchannel device according to claim 11, wherein the cyclic olefin copolymer in each of the channel walls and the cyclic olefin copolymer in the protective layer are identical to each other.

13. The microchannel device according to claim 9, wherein the protective layer is formed by using a hydrophobic resin different from the cyclic olefin copolymer.

* * * * *